United States Patent [19]

Yanagita et al.

[11] 3,944,182
[45] Mar. 16, 1976

[54] APPARATUS FOR MANUFACTURING HIGH-FREQUENCY COIL DEVICES

[75] Inventors: Tadafumi Yanagita, Kamifukuoka; Teruo Tamada, Asaka; Yuma Tanaka, Iruma, all of Japan

[73] Assignee: Toko, Inc., Tokyo, Japan

[22] Filed: June 13, 1974

[21] Appl. No.: 478,867

Related U.S. Application Data

[62] Division of Ser. No. 358,060, May 7, 1973, abandoned.

[30] Foreign Application Priority Data

May 12, 1972  Japan.................................. 47-46432

[52] U.S. Cl. ...................... 249/83; 249/96; 264/272
[51] Int. Cl.² ......................................... B22D 19/00
[58] Field of Search ........... 249/83, 84, 177, 90, 91, 249/33, 93, 94, 37, 96, 97, 105, 134, 85, 95, 98, 122, 124; 425/DIG. 7, DIG. 127; 264/272, 271, 275

[56] References Cited
UNITED STATES PATENTS

| 2,454,193 | 11/1948 | Martin | 249/94 X |
|---|---|---|---|
| 2,516,766 | 7/1950 | Gibbs | 249/96 X |
| 2,580,668 | 1/1952 | Franz | 249/96 |
| 3,059,669 | 10/1962 | Fitzpatrick | 425/DIG. 7 |
| 3,100,676 | 8/1963 | Christie | 249/96 X |
| 3,109,201 | 11/1963 | Dulmage | 249/94 |
| 3,236,491 | 2/1966 | Keinanen | 249/96 |
| 3,255,302 | 6/1966 | Frank | 249/96 |
| 3,278,997 | 10/1966 | Schrader | 164/37 |
| 3,355,772 | 12/1967 | Kolberg | 249/96 X |
| 3,542,328 | 11/1970 | Deitrick | 249/95 |
| 3,590,329 | 6/1971 | Krepps | 264/271 |
| 3,712,575 | 1/1973 | Bement | 264/272 |
| 3,783,057 | 1/1974 | McNerney | 249/90 X |

*Primary Examiner*—Francis S. Husar
*Assistant Examiner*—John S. Brown

[57] ABSTRACT

A method and apparatus for manufacturing high-frequency coil devices, wherein a solid cylindrical rod-like mandrel having a coil element loaded thereon is inserted between lower and upper molds each of which is provided with a resilient layer, so that an annular cavity is defined between the peripheral surface of the mandrel and the resilient layers. The coil element is positioned within the annular cavity, and compressively enclosed by the resilient layers so as to be partially embedded therein, with the opposite end portions thereof being held in a fluid-tight manner between the resilient layers so as to be isolated from the mold cavity. A molten resin is injected into the mold cavity, and after the resin thus injected has been solidified, the resulting coil device is automatically removed from the mandrel through relative movement of the molds and mandrel.

1 Claim, 9 Drawing Figures

APPARATUS FOR MANUFACTURING HIGH-FREQUENCY COIL DEVICES

This is a division of application Ser. No. 358,060, filed May 7, 1973, now abandoned.

This invention relates generally to the manufacture of electronic components, and more particularly to an improved method and apparatus for manufacturing highfrequency coil devices.

A variety of high-frequency coil devices have been proposed, among which is one comprising a coil element and a resin bobbin molded integrally therewith in such a manner that each turn of the coil element is partially projected out of it. In the conventional method of manufacturing such a coil device, use is made of a pair of rigid metallic molds each of which is formed with a semi-cylindrical recess and axially spaced arcuate grooves formed in the semi-cylindrical surface of the recess; a solid cylindrical rod-like mandrel having a coil element loaded thereon is inserted between the two molds so that the coil element is enclosed by the semi-cylindrical recesses which form a mold cavity together with the peripheral surface of the mandrel, with the turns of the coil element being partially fitted in the arcuate grooves respectively; and then a molten resin is injected into the aforementioned mold cavity. The number and pitch of the arcuate grooves mentioned above are so selected as to conform to those of the coil element turns, and the depth of each groove is such that each turn of the coil element is partially fitted therein as described above.

Disadvantageously, however, the prior art mentioned above requires a sophisticated technique for forming the arcuate grooves with a high precession. More important, the prior-art molds can be utilized only for a specific type of coil element, since the number, pitch, etc. of the arcuate grooves are selected so as to be adapted only for such a specific type of coil element. In other words, if the number of pitch of the turns of the coil element is varied, the same molds can no longer be utilized. Further disadvantages of the prior art will become apparent hereinafter.

The primary object of this invention is to provide a novel method and apparatus by which high-frequency coil devices can be produced at lower cost and on a massproduction basis.

Another object of this invention is to provide an inexpensive but greatly improved method and apparatus for manufacturing high-frequency coil devices.

A further object of this invention is to provide a novel method and apparatus for producing high-frequency coil devices comprising a coil element and a resin bobbin molded integrally therewith.

Other objects, features and advantages of this invention will become apparent from the following description taken in conjunction with the accompanying drawings.

According to one aspect of this invention, there are provided a method and apparatus for manufacturing high-frequency coil devices, wherein a solid cylindrical rod-like mandrel having a coil element loaded thereon is disposed into engagement with lower and upper molds each provided with a resilient layer, so that an annular cavity is defined between the mandrel and the resilient layers, with the coil element being compressively enclosed by the resilient layers and partially embedded therein; a molten resin material is injected into the annular cavity to form a bobbin molded integrally with the coil element, those portions of the coil element which are embedded in the resilient layers being projected out of the bobbin; thereafter, the resulting coil device comprising the coil element and integrally molded bobbin is automatically removed through relative movement of the molds and mandrel. Furthermore, the opposite end portions of the coil element are held in a fluid-tight manner between the resilient layers so as to be isolated from the mold cavity, whereby flash is prevented from occurring thereat.

Figure 5A:
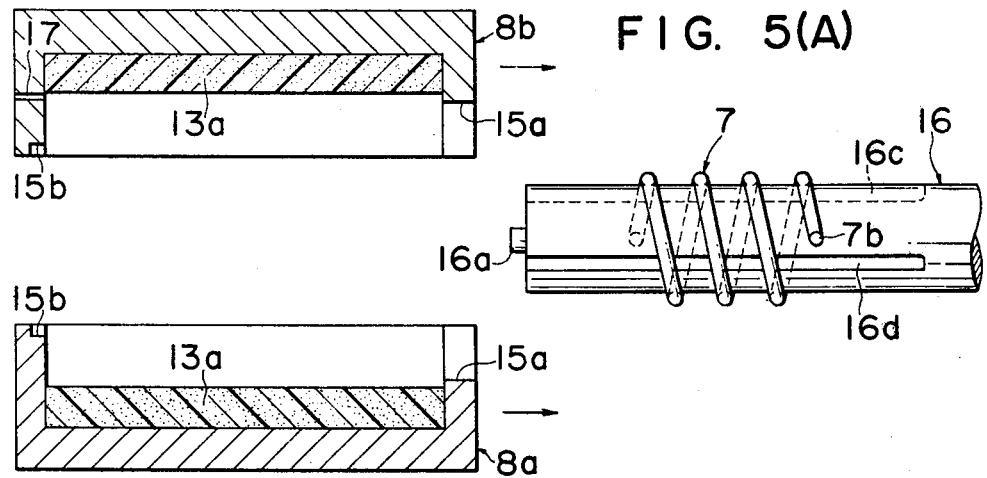
Figure 5B:
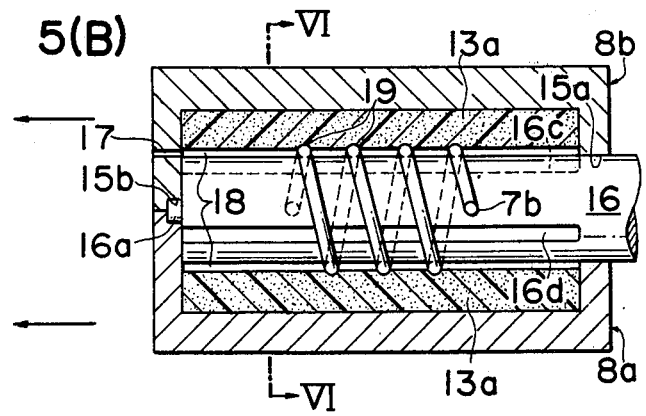
Figure 6:
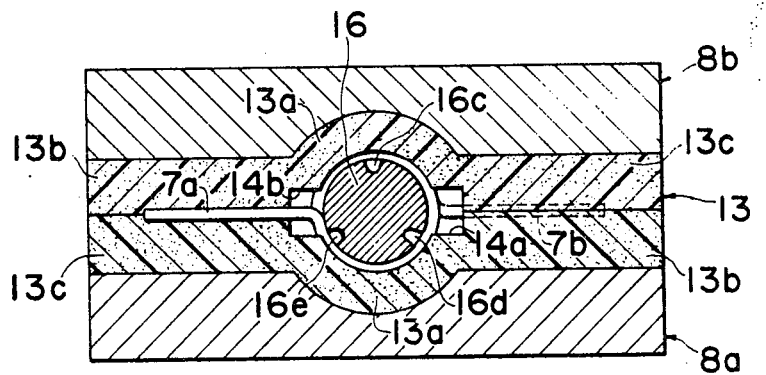

FIGS. 5(A) and (B) are schematic views, partly in section, useful for explaining the method and apparatus of this invention;

FIG. 6 is a sectional view taken along the line VI—VI of FIG. 5(B); and

Figure 7A:
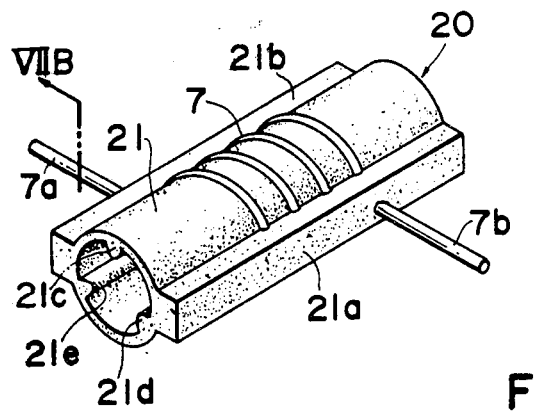
Figure 7B:
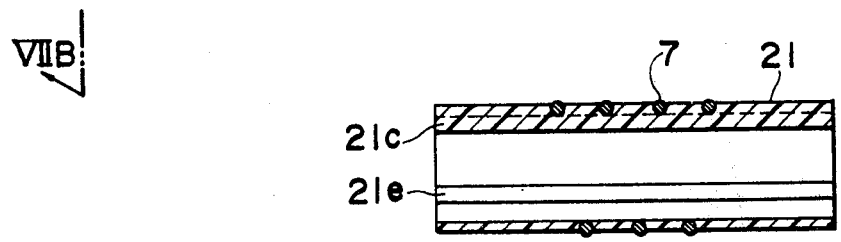

FIG. 7(A) is a perspective view of an example of the high-frequency coil device manufactured in accordance with this invention, and FIG. 7(B) is a sectional view taken along the line VIIB—VIIB of FIG. 7(A).

Figure 1:
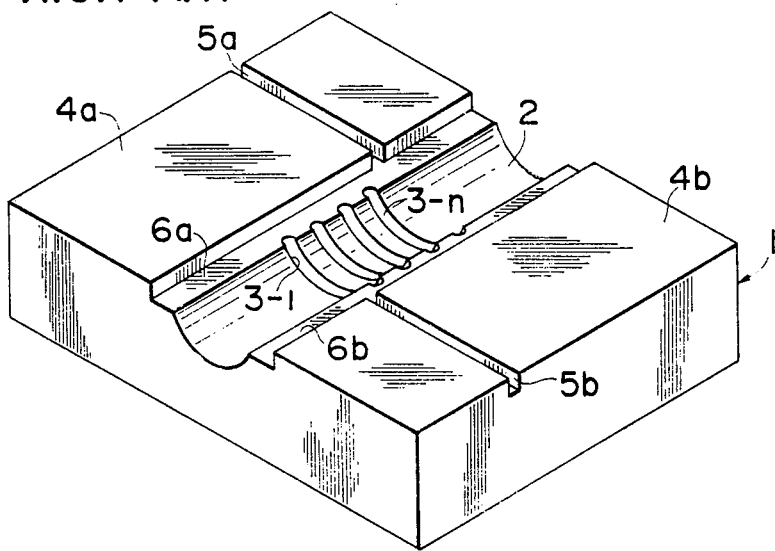
FIG. 1 is a perspective view showing an example of the lower or upper mold according to the prior art.

Referring to FIG. 1, there is shown a conventional mold 1 which can be employed for producing high-frequency coil devices. The mold 1 is formed with a semi-cylindrical recess 2 having axially spaced arcuate grooves 3-1, . . . , 3-n formed therein. On the opposite sides of the recess 2 are provided substantially flat surfaces 4a and 4b which have rectilinear grooves 5a and 5b formed at positions corresponding to the outermost arcuate grooves 3-1 and 3-n respectively. Furthermore, stepped portions 6a and 6b are provided at the borders between the flat surfaces 4a, 4b and the recess 2.

Figure 2:
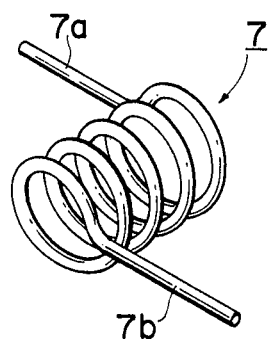
FIG. 2 is a perspective view showing an example of the coil element to which this invention is applicable.

In producing high-frequency coil devices, two such molds are used as lower and upper molds in conjunction with a rod-like mandrel onto which is loaded a coil element such for example as shown at 7 in FIG. 2. The mandrel having the coil element 7 loaded thereon is placed between the lower and upper molds 1, and then the molds are closed into engagement with the mandrel so that an annular space or cavity is defined between the surface of the mandrel and the recesses 2 of the two molds. In this case, the coil element 7 loaded on the mandrel is disposed in engagement with the arcuate grooves 3-1, . . . , 3-n, with the opposite end portions 7a and 7b thereof being placed in the rectilinear grooves 5a and 5b respectively. Thereafter, a molten resin material is injected into the annular cavity defined between the mandrel and the recesses 2 of the molds 1.

However, the foregoing conventional arrangement is disadvantageous in that the molds can only be used for a specific type of coil element since the number and pitch of the arcuate grooves formed therein are selected so as to correspond to those of the turns of such a coil element. In other words, various molds must be prepared to process coil elements having a varying pitch or number of turns. Obviously, this will lead to a great increase in the cost of the products as well as the apparatus per se. A further disadvantage is that the molten resin material injected into the annular cavity is permitted to flow into the grooves 5a and 5b in which are accommodated the opposite end portions 7a and 7b of the coil element 7 so that flashes are inevitably caused to occur thereat. To remove such flashes, tedious work must be done, which not only further increases the cost of the products but also tends to result in a poor yield.

Figure 3:
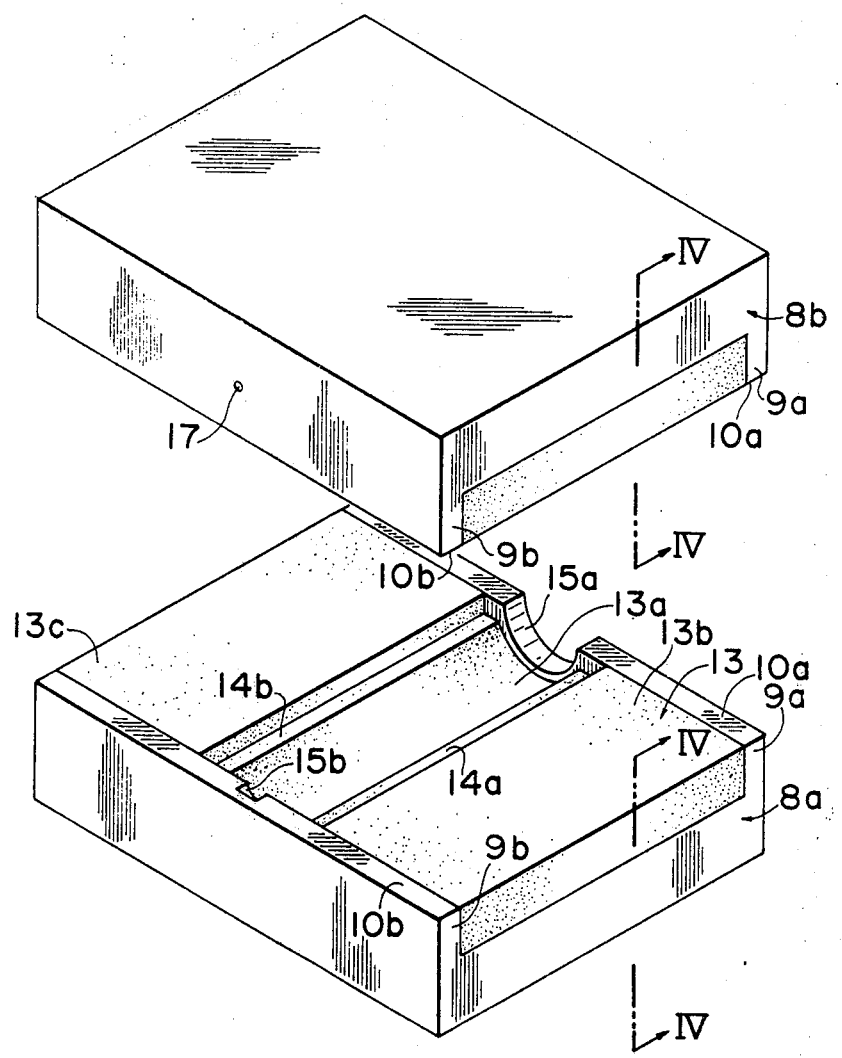
FIG. 3 is a perspective view showing the lower and upper molds according to this invention.
Figure 4:
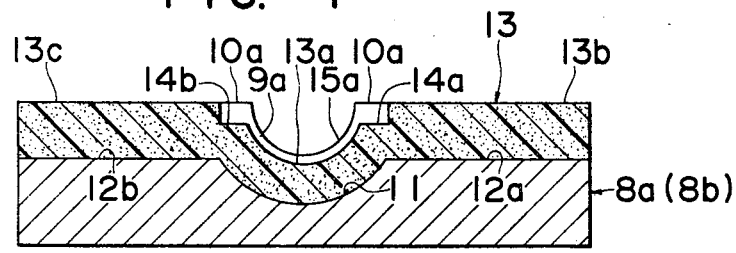
FIG. 4 is a sectional view taken along the lines IV—IV of FIG. 3.

Turning now to FIG. 3 of the drawings, there are shown a lower mold indicated generally at 8a and an upper mold indicated generally at 8b which are constructed in accordance with the present invention. FIG. 4 is a sectional view taken along the lines IV—IV of FIG. 3. As best shown in these figures, each of the lower and upper molds 8a and 8b is provided with a pair of vertical end walls 9a and 9b having flat top surfaces 10a and 10b respectively. Between the end walls 9a and 9b is formed a recess 11, on the opposite sides of which two flat surfaces 12a and 12b extend. Although the recess is shown as semi-cylindrical, it is to be understood that the recess may take any suitable shape. A resilient layer indicated generally at 13 is provided on the recess 11 and flat surfaces 12a, 12b. The resilient layer 13 is formed by a heat-resisting, resilient material such for example as rubber, silicone rubber, synthetic rubber or the like, and it comprises a layer portion 13a covering the recess 11 and layer portions 13b and 13c covering the flat surface 12a and 12b respectively. The layer portions 13b and 13c are made substantially flush with the top surfaces 10a and 10b of the end walls 9a and 9b. The layer portion 13a has a semi-cylindrical surface similar to that of the recess 11 and may be made smaller in thickness than the layer portions 13b and 13c. At the respective borders between the layer portion 13a and the layer portions 13b, 13c are provided stepped portions 14a and 14b, the function of which will be described hereinafter. In the top surfaces 10a and 10b of the end walls 9a and 9b of each mold are formed semi-cylindrical notches 15a and 15b respectively. The notch 15a extends completely across the end wall 9a and is adapted to be disposed in snug engagement with the periphery of a solid cylindrical rod-like mandrel indicated generally at 16 in FIG. 5, and the notch 15b, which is smaller than the notch 15a, extends partially across the end wall 9b and is adapted to be disposed in snug engagement with a smaller-diameter portion 16a provided at the forward end of the mandrel 16 shown in FIG. 5. Mandrel 16 has plural, say three, circumferentially equally spaced, axially extending grooves 16c, 16d and 16e formed in the periphery thereof. The upper mold 8b has a through-aperture 17 formed in that portion of the end wall 9b which extends between the layer portion 13a and the smaller notch 15b.

The method according to an embodiment of this invention will now be described with reference to FIGS. 5 and 6. First of all, such a coil element 7 as shown in FIG. 2 is loaded onto the mandrel 16 as shown in FIG. 5. The coil element 7 may be either preformed one or one which is formed by winding a wire onto the mandrel; in either case, the coil element 7 has the opposite end portions 7a and 7b thereof extended horizontally and perpendicularly with respect to the axis of the mandrel 16.

Thereafter, the lower and upper molds 8a and 8b are moved in the direction as indicated by arrows in FIG. 5(A), and then moved toward each other to be closed as shown in FIG. 5(B), so that the notches 15a and 15b are disposed in snug engagement with the periphery of the mandrel 16 and smaller-diameter forward end portion 16a thereof respectively. It will be readily apparent to those skilled in the art that the lower and upper molds 8a and 8b may be displaced from the position shown in FIG. 5(A) to the closed position shown in FIG. 5(B) while being moved toward each other. Alternatively, the mandrel 16 may be displaced to be placed between the molds, and then the molds may be closed. In this way, an annular cavity 18 is defined between the mandrel 16 and the layer portions 13a of the lower and upper molds, and the coil element 7 on the mandrel 16 is located in the annular cavity 18 in such a manner as to be compressively enclosed by the layer portions 13a and partially embedded therein as indicated at 19 in FIG 5(B). In this case, the opposite end portions 7a and 7b of the coil element 7 are held in a fluid-tight manner between the lower and upper layer portions 13b, 13c and between the lower and upper layer portions 13c, 13b, respectively, as shown in FIG. 6.

Subsequently, a molten resin material to be molded, which may be either a thermosetting resin or thermoplastic resin, is injected into the aforementioned annular cavity 18 through the aperture 17 of the upper mold 8b by means of a nozzle (not shown) connected with a resin material source (not shown).

After the molten resin material injected into the annular cavity 18 has been solidified, the lower and upper molds 8a and 8b are displaced in the direction as indicated by arrows in FIG. 5(B) so that a resulting coil device such as shown generally at 20 in FIG. 7 is automatically removed from the mandrel 16, and then the molds are opened to take out the device. The displacement of the molds may be effected while they are being moved away from each other to be opened completely. Alternatively, the mandrel 16 may be pulled out from between the molds, and then the molds may be opened.

Referring to FIG. 7(A), the coil device 20 manufactured in accordance with the principles of this invention comprises the coil element 7 and a molded bobbin 21 having the coil element integrally embedded therein. The bobbin 21 includes opposite flange-like portions 21a and 21b which are formed due to the presence of the stepped portions 14a and 14b at the borders between the layer portions 13a and the layer portions 13b, 13c of each mold. Such flange-like portions 21a, 21b of the bobbin 21 serve to reinforce the device. Furthermore, the bobbin 21 is provided on the inner surface thereof with circumferentially equally spaced, axially extending ribs 21c, 21d and 21e which are formed due to the presence of the grooves 16c, 16d and 16e in the periphery of the mandrel 16. These ribs serve to hold a magnetic core (not shown) inserted in the hole of the bobbin 16 and increase the mechanical strength of the adherence of the bobbin to the coil element.

As will be seen from FIG. 7(B), which is a sectional view taken along the line VIIB—VIIB of FIG. 7(A), each turn of the coil element 7 is partially projected out of the outer periphery of the bobbin 21. The extent of this projection depends upon the Q, mechanical strength and mechanical precision required of the coil device. It is to be understood that the material constituting the layer 13, the thickness thereof, etc. are so selected as to permit the coil element to be embedded in the layer portions 13a of each mold to such an extent that the desired projection of each turn of the coil element out of the bobbin can be achieved.

As will be appreciated from what has been described, in accordance with this invention, the aforementioned problems with the prior art can be completely solved. More specifically, any desired coil device can be produced without changing the molds for any number or pitch of the turns of a coil element. In addition, the molds according to this invention, unlike the prior-art ones, are provided with no special grooves for engagement with the turns of the coil element, so that they can be manufactured at much lower cost. A further advantage is that the coil element can be prevented from being damaged during the molding operation by virtue of the fact that it is enclosed by the resilient layers instead of by rigid surfaces as in the prior art. A still further advantage is that no flash is caused to occur at the opposite end portions of the coil element since such end portions are held in fluid-tight manner between the resilient layers to be isolated from the mold cavity. Although the resilient layer was provided on each of the two molds in the foregoing embodiment of this invention, it is to be understood that such a layer may be provided on the mandrel or both on the molds and mandrel.

While the present invention has been described with respect to some specific embodiments thereof, it is to be understood that the foregoing description is only exemplary of the invention and various modifications and changes may be made within the spirit and scope of the invention as defined in the appended claims.

We claim:

1. An apparatus for manufacturing a high-frequency coil device comprising a coil element having a plurality of coaxial turns and a pair of connector leads integral therewith, and a generally cylindrical, hollow bobbin molded integrally with said coil element wherein the turns of said coil element are partially projected out of the outer surface of said bobbin and said connector leads are extended outwardly of said bobbin and substantially perpendicularly with respect to the axis of said coil element said apparatus comprising a pair of molds, and a rod-like mandrel, each of said molds including a semi-cylindrical recess and substantially flat surface portions formed in a molding surface thereof, said substantially flat surface portions extending in opposite directions from the opposite sides of said semi-cylindrical recess respectively, a pair of walls for enclosing the recesses in cooperation with said mandrel when said molds are closed, and an aperture formed in one of said walls of one of said molds for permitting of the injection of a molten resin material into a mold cavity defined by said molds and said mandrel, said mandrel adapted to receive a coil element thereon and said molds, when closed, adapted to receive said mandrel with said coil element thereon within said mold cavity such that when the molten resin material is injected into said mold cavity, a bobbin integral with said coil element is formed, characterized in that each of said molds further includes a resilient layer provided on said molding surface, said resilient layer comprising a semi-cylindrical portion corresponding to said semi-cylindrical recess and substantially flat portions corresponding to said substantially flat surface portions respectively, said resilient layer being of such a thickness that when said molds are closed said coaxial turns of said coil element are compressively engaged thereby and only partially buried therein and said connector leads of said coil element are held in a fluid tight manner between said substantially flat portions thereof so as to be isolated from said mold cavity; and that said resilient layer has a pair of stepped portions provided between said semi-cylindrical portion and said substantially flat portions thereof and extending along the opposite sides thereof respectively.

* * * * *